United States Patent
Oberti et al.

(10) Patent No.: US 9,080,625 B2
(45) Date of Patent: Jul. 14, 2015

(54) BRAKING BAND OF A DISC FOR A VENTILATED-TYPE DISC BRAKE

(75) Inventors: Leone Oberti, Lenna Bergamo (IT); Gianluigi Maronati, Bergamo (IT)

(73) Assignee: FRENI BREMBO S.P.A. (IT)

( * ) Notice: Subject to any disclaimer, the term of this patent is extended or adjusted under 35 U.S.C. 154(b) by 72 days.

(21) Appl. No.: 12/939,578

(22) Filed: Nov. 4, 2010

(65) Prior Publication Data

US 2011/0108378 A1    May 12, 2011

Related U.S. Application Data

(63) Continuation of application No. PCT/IT2008/000304, filed on May 5, 2008.

(51) Int. Cl.
  F16D 65/12    (2006.01)
  F16D 65/02    (2006.01)

(52) U.S. Cl.
  CPC ...... F16D 65/128 (2013.01); F16D 2065/1328 (2013.01)

(58) Field of Classification Search
  USPC ..... 188/18 A, 218 XL, 264 A, 264 AA, 71.6; 192/113.2, 113.23
  See application file for complete search history.

(56) References Cited

U.S. PATENT DOCUMENTS

| | | |
|---|---|---|
| 4,865,167 A | 9/1989 | Giorgetti |
| 5,542,503 A | 8/1996 | Dunn |
| 6,367,599 B2 | 4/2002 | Kobayashi |
| 7,066,306 B2 | 6/2006 | Gavin |
| 7,267,210 B2 | 9/2007 | Cornolti |
| 2004/0124047 A1 | 7/2004 | Oberti |
| 2006/0243546 A1 | 11/2006 | Oberti |

FOREIGN PATENT DOCUMENTS

| | | |
|---|---|---|
| DE | 1164455 | 3/1964 |
| WO | 02064992 A2 | 8/2002 |
| WO | 2004102028 A1 | 11/2004 |
| WO | 2004102029 A1 | 11/2004 |

OTHER PUBLICATIONS

International Search Report PCT/IT2008/000304; Dated Feb. 5, 2009.

Primary Examiner — Robert A Siconolfi
Assistant Examiner — Vu Q Nguyen
(74) Attorney, Agent, or Firm — Cantor Colburn LLP (57) ABSTRACT

A braking band of a disc for a ventilated-type disc brake, uncommonly capable of a high cooling and high resistance to mechanical and thermal stresses, extends between an inner diameter and an outer diameter, said braking band comprises two plates mutually facing and defining an interspace, mutually linked by heat dissipation and connecting means or members; at least some of said connecting means are shaped as small columns projecting from a plate towards the opposite plate in the form of pillars, which are grouped in at least one circumferentially arranged row or rank; at least some of said pillars of said at least one rank have, in a plane substantially parallel to the air flow along the ventilation ducts, a substantially rhombus- or diamond-shaped section with four vertexes joined by four sides, wherein said sides defining said section are concave to form a star shape.

18 Claims, 12 Drawing Sheets

Fig. 8a  Fig. 8b (State of the art)     (State of the art)

Fig. 8c          Fig. 8d (State of the art)

Fig. 9a     Fig. 9b

BRAKING BAND OF A DISC FOR A VENTILATED-TYPE DISC BRAKE

FIELD OF THE INVENTION

It is the object of the present invention a braking band of a disc for a ventilated-type disc brake.

BACKGROUND OF THE INVENTION

As it is known, the discs for disc brake comprise a cap or a hub, adapted to associate the disc to a hub of a vehicle, from which an annular portion extends which is called braking band intended to cooperate with pads of a caliper. In the case of the ventilated-type discs, the braking band is obtained by means of two plates respectively facing and mutually connected through connection members, for example in the form of pillars or tabs. The outer surfaces of the two plates define opposite braking surfaces, while the inner surfaces define, in conjunction with the pillars or the tabs, define ventilation ducts for the disc cooling which are passed through by air according to a centrifugal direction during the rotational motion of the same disc.

It is known that the braking action exerted by the pads against the disc braking surfaces generates heat, consequently a temperature increase of the disc, until making the same disc incandescent in the case of a particularly heavy performance. Due to the high temperature which the disc reaches during the braking action, the disc deforms, and the contact between pads and braking surfaces deteriorates. Furthermore, the friction material of the pads undergoes a kind of vitrification and pollution by the disc material.

It has been further found that the highest temperature is reached at a central annular portion of the braking surfaces, i.e. at a central annular portion of the outer surfaces of the respective plates. During the disc life, such area is readily prone to the formation of cracks.

In order to obviate the drawbacks set forth above, therefore, the need to increase the dispersion efficiency of the heat generated by the braking action, so as to limit the temperatures reached by the disc during and following the braking action on one hand, and the need to increase the mechanical strength of these braking band central portions, on the other hand, are particularly felt in the field.

Solutions are known from WO 2004/102028, and also from WO 2002/064992; U.S. Pat. Nos. 7,066,306; 7,267,210; US 2006 0243546; US 2004 0124047; U.S. Pat. Nos. 6,367,599; 5,542,503; and 4,865,167. While being satisfactory from several point of view, these known solutions do not allow reaching a compromise between mechanical strength which is desired in the braking band central annular area and the conflicting need to maximize, in the same area, the air flow able to eliminate the high localized temperature increase which is caused by the braking action.

SUMMARY OF THE INVENTION

The problem underlying the present invention is to provide a braking band of a disc for a ventilated-type disc brake which has such structural and functional characteristics as to meet the above-mentioned need, while obviating the drawbacks reported above with reference to the prior art.

Such problem is solved by a braking band of a disc for a ventilated-type disc brake in accordance with claim 1, a disc in accordance with claim 18, and a pillar member as described in claim 19.

In accordance with a general embodiment, a braking band of a disc for a ventilated-type disc brake comprises two plates mutually facing and defining an interspace, said plates being mutually linked by heat dissipation and connecting means or members, and at least some of said connecting means are in the shape of small columns projecting from a plate towards the opposite plate in the form of pillars.

Advantageously, said pillars are grouped in at least one circumferentially arranged row or rank, and at least some between said pillars of said at least one rank have, in a plane substantially parallel to the air flow along the ventilation ducts, a substantially rhombus- or diamond-shaped section with four vertexes joined by four sides, in which said sides defining said section are concave to form a star shape.

In accordance with another advantageous embodiment, which is not necessarily implemented in conjunction with the previous one, a braking band has more rows or ranks of pillars, said more ranks of pillars being mutually concentric arranged, and in which the rank arranged in the proximity of the band radially outer edge far from the band rotation axis (X-X) has at least some of the pillars having a substantially triangular transversal section with the base facing towards the disc outer part and sides within the ventilation duct having a concave profile, in which said triangular section extends the concave sides thereof by overlapping the adjacent row or rank in the radial direction.

BRIEF DESCRIPTION OF THE DRAWINGS

Further characteristics, and the advantages of the braking band of a disc for a ventilated-type disc brake according to the invention will be clear from the description set forth below of preferred exemplary embodiments, given by way of non-limiting example, with reference to the annexed Figures, in which.

DESCRIPTION OF THE PREFERRED EMBODIMENTS

With reference to the above-mentioned Figures, a disc for a ventilated-type disc brake has been generally indicated with 10. A cap or hub has been indicated with 12, and a braking band has been indicated with 14.

Figure 4:
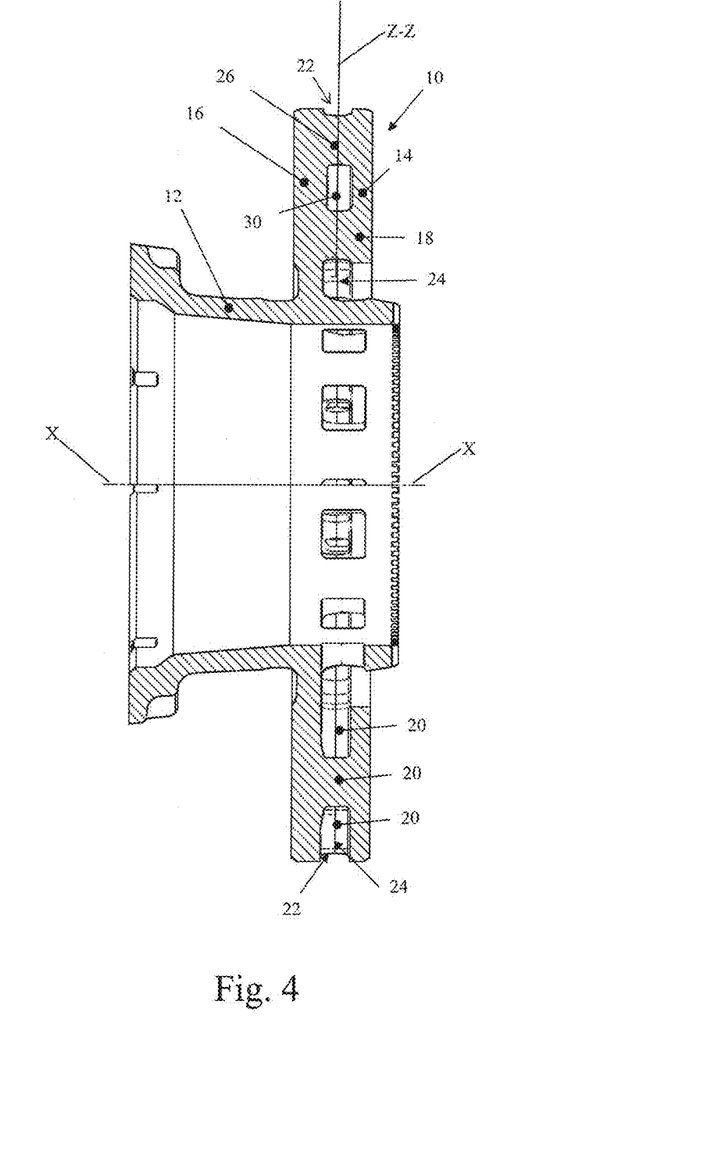
FIG. 4 illustrates a sectional view according to the line IV-IV of the disc in FIG. 2.

An axis around which the disc rotates has been indicated with the reference X-X. By direction axial to the disc or braking band is meant a direction parallel to the X-X axis. The radial direction to the disc or braking band, i.e. a direction perpendicular to the axial direction or the X-X axis, has been generally indicated with the reference Z-Z. Finally, by direction T-T tangential or circumferential to the disc is meant a direction tangent to a circumference having its centre on the X-X axis and lying on a plane perpendicular thereto (for example, FIG. 4).

Figure 3:
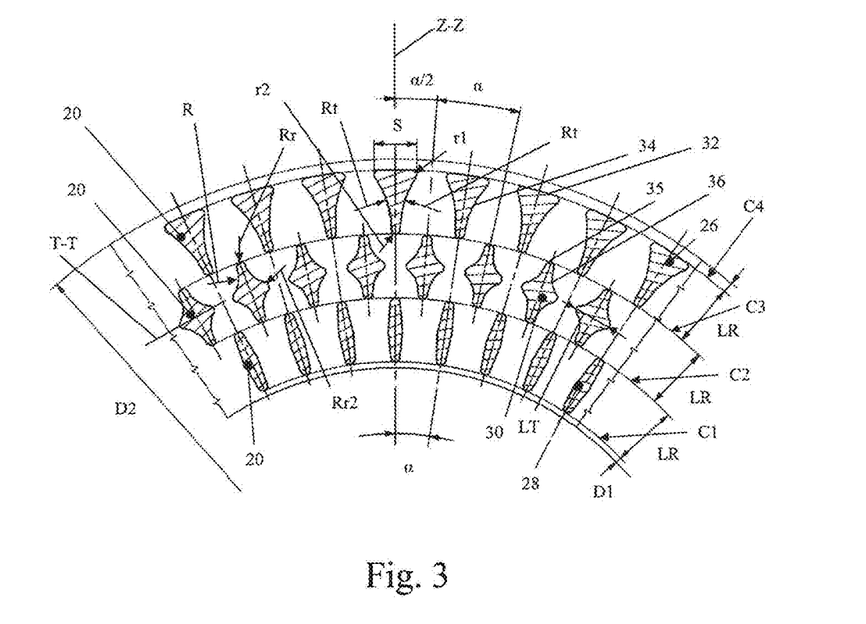
FIG. 3 illustrates an enlarged detail of the disc of FIG. 2.

The braking band 14 extends between an inner diameter D1, near to the disc rotation axis X-X, and an outer diameter D2, far from said disc rotation axis X-X (for example, FIG. 3).

The braking band comprises two plates 16 and 18 linked by connecting means, for example in the form of pillars 20. An interspace 22 is defined between the two plates 16 and 18 which is divided into ventilation ducts by the connecting means.

Of the two plates, the one which is at the same side in which the cap extends has been indicated with 16, relative to a median plane 24 of the interspace between the two plates, while the one which is at the side opposite to the one to which the cap extends has been indicated with 18, relative to the above-mentioned median plane 24 of the interspace between the two plates.

Figure 5:
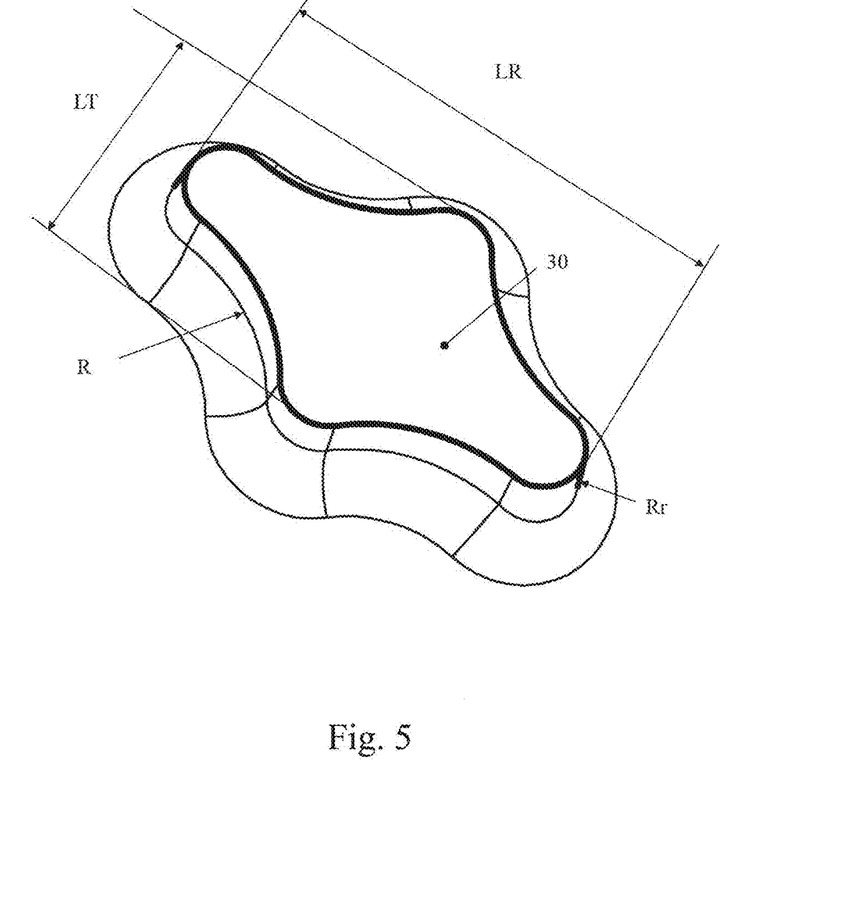
FIG. 5 illustrates a partially sectional perspective view of a pillar.
Figure 6A:
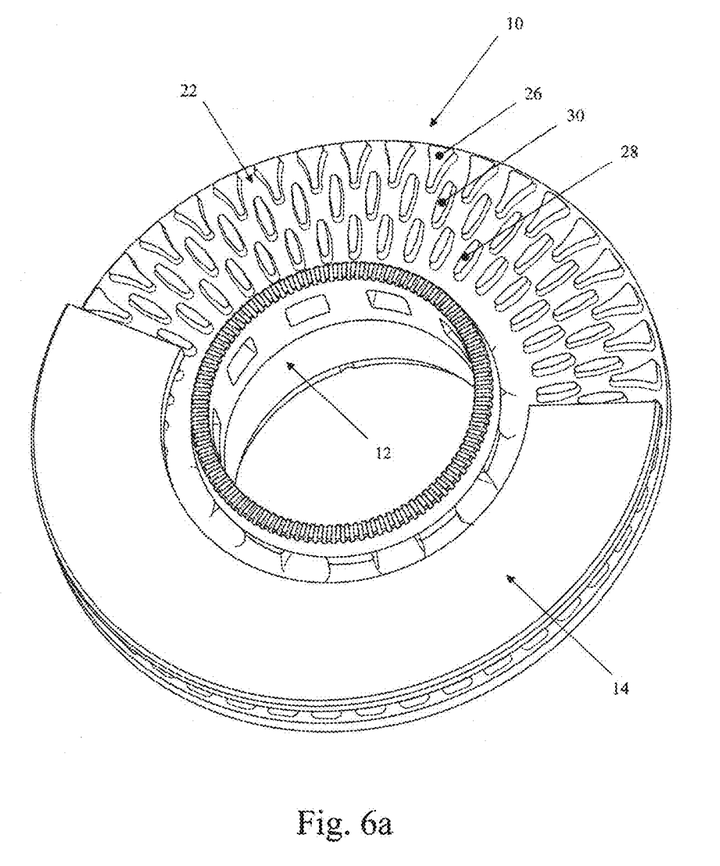
FIGS. 6a and 6b illustrate two partially sectional perspective views of a disc for disc brake in accordance with a further embodiment.
Figure 6B:
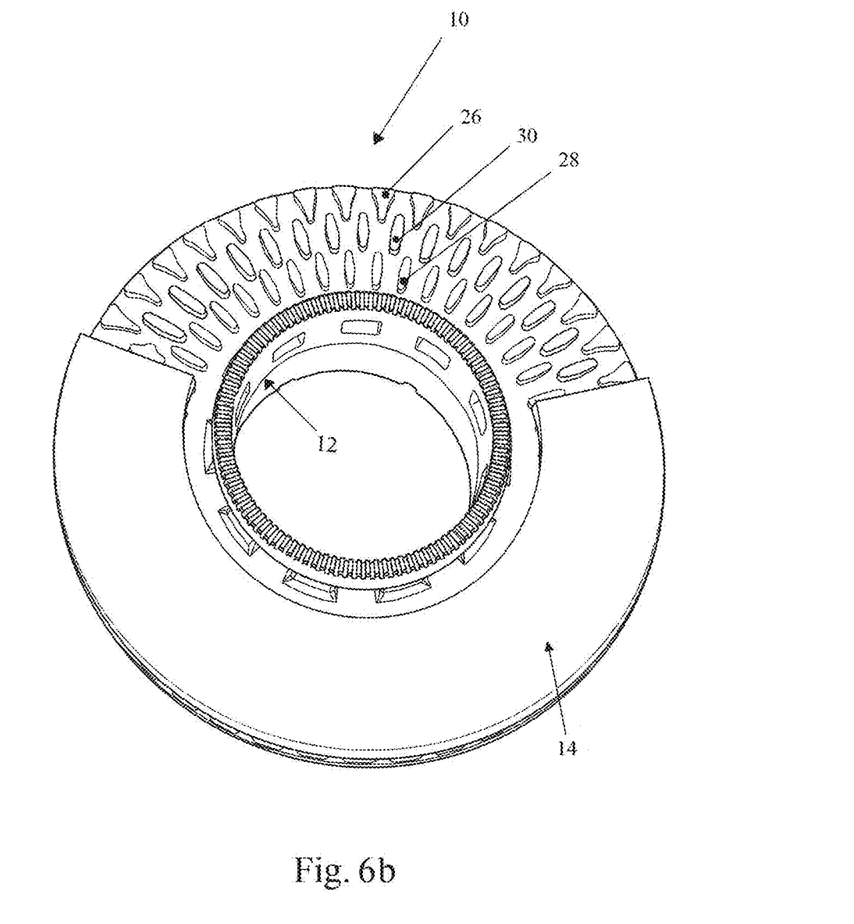
Figure 7A:
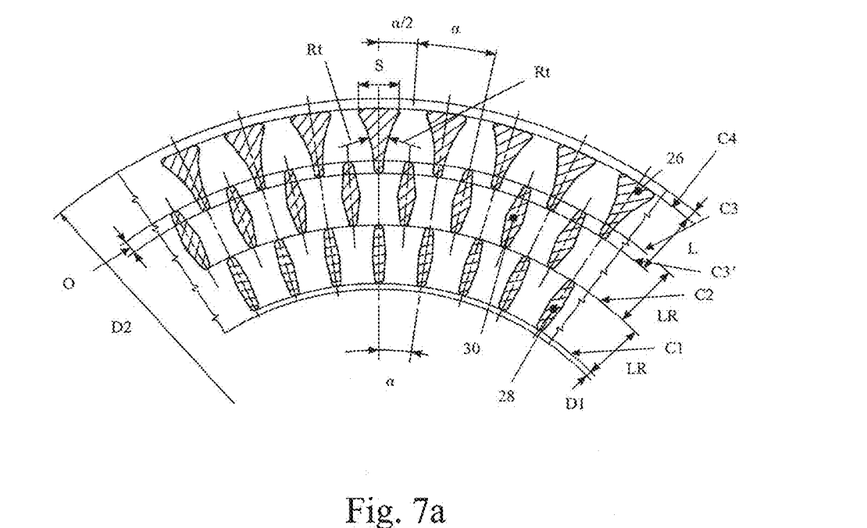
FIG. 7a illustrates an enlarged detail of the disc of FIG. 6.
Figure 7B:
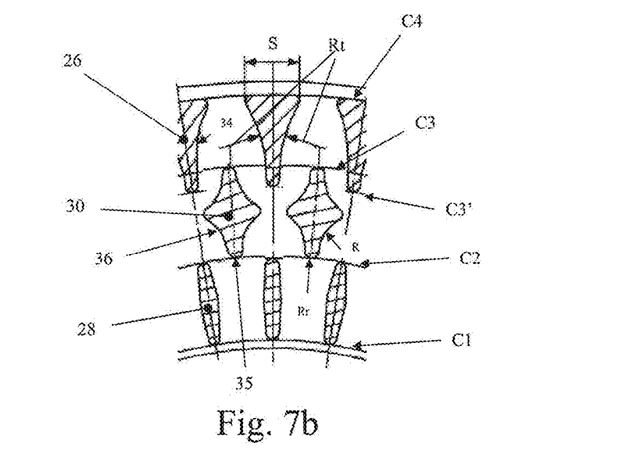
FIG. 7b illustrates a sectional front view of a detail of the ranks of pillars according to a further solution.

In accordance with an embodiment, a connection pillar 20 between two plates 16, 18 of a braking band 14 of a disc 10 for a ventilated-type disc brake has, in a plane substantially parallel to the air flow along the ventilation duct, a substantially rhombus- or diamond-shaped section with four vertexes joined by four sides in which said sides, which define said section, are concave, in other words, they come to form a star shape the radiuses of which tamper more than linearly, by advantageously extending in a substantially radial and tangential direction.

Thanks to this shape of the pillar section, an extended area which is intended to the connection with the plates is obtained, but, at the same time, a large passageway for the air passing through the band interspace 22 is maintained, thus promoting cooling and not compromising structural strength.

In accordance with an embodiment, the braking band 14 extends between an inner diameter D1, near to a disc rotation axis X-X, and an outer diameter D2, far from said disc rotation axis X-X. Said braking band 14 comprises two plates 16, 18 which are mutually facing and defining an interspace 22. Said plates 16, 18 are mutually linked by heat dissipation and connecting means or members 20, and at least some of said connecting means are so shaped as small columns projecting from a plate towards the opposite plate in the form of pillars 20. Said pillars 20 are grouped in at least one circumferentially arranged row or rank 30. Advantageously, at least some of said pillars 20 of said at least one rank 30 have, in a plane substantially parallel to the air flow along the ventilation ducts, a substantially rhombus- or diamond-shaped section with four vertexes 35 joined by four sides 36 in which said sides defining said section are concave to form a star shape.

In accordance with an embodiment, a braking band 14 has all the pillars 20 in the same rank 30 or row with rhomboidal section and concave sides.

In accordance with an embodiment, more rows or ranks 26; 28; 30 of pillars are provided, and said more ranks are mutually concentrically arranged. Advantageously, each pillar is offset relative to the nearest pillars of the ranks put in a side-by-side relationship in a quincunx arrangement.

In accordance with an embodiment, the rhomboidal section has at least one side portion concave as an arc of a circle, preferably with a radius R ranging between 5 mm and 20 mm, and preferably with a radius R of 12 mm.

In accordance with an embodiment, the rhomboidal section has all its sides concave, with at least one portion in the form of an arc of a circle, preferably with a radius R ranging between 5 mm and 20 mm, and preferably with a radius R of 12 mm.

In accordance with an embodiment, the rhomboidal section has, between at least two of said concave sides, a convex vertex with at least one portion in the form of an arc of a circle, preferably with a radius Rv ranging between 1 mm and 4 mm, preferably with a radius Rv of 2.5 mm.

In accordance with an embodiment, the rhomboidal section has sides and vertexes which are entirely formed by curved lines, said concave sides and said convex vertexes, preferably in the shape of arcs of a circle, are mutually joined, so as to avoid edges and rectilinear lengths.

In accordance with an embodiment, the rhomboidal section is symmetrical relative to a radial axis Z-Z or r, arranged transversal to the band rotation axis X-X, and preferably said section is symmetrical relative to a tangential axis T-T arranged orthogonally to this radial axis Z-Z and also to the rotation axis X-X.

In accordance with an embodiment, the rhomboidal section extends in the radial direction by a preset height LR, and in the tangential direction by a preset width LT. Advantageously, said height LR has a preset value ranging between 1.5 and 2 folds the width LT. Advantageously,

LR=1.7 LT.

In accordance with an embodiment, the pillars 20 of the braking band are grouped in at least three ranks comprising at least one outer rank 26, with pillars having a substantially triangular or rhomboidal section, an intermediate rank 30 with pillars having a star-shaped section, and an inner rank 28 near to the disc axis X-X, the pillars of said inner rank 28 having a substantially rhomboidal section in a plane which is parallel to the air flow along the ventilation ducts.

In accordance with an embodiment, the sections of the pillars of at least two ranks 28, 30 in the same plane parallel to the air flow have the same radial extension. Advantageously, the sections of all the ranks 26, 28, 30 have the same radial extension.

In accordance with an embodiment, said ranks 26, 28, 30 do not mutually overlap the disc in the radial direction Z-Z.

In accordance with an embodiment, the number of pillars is the same in all the ranks 26, 28, 30.

In accordance with an embodiment, the ratio between band D2 outer diameter and maximum thickness of an interspace 22 between the two plates 16, 18 measured in the direction parallel to the disc axis X-X ranges between 15 and 32, preferably between 21 and 25, advantageously 23.

In accordance with an embodiment, a disc for a ventilated-type disc brake 10 comprises a cap 12 and a braking band 14 as defined above.

In accordance with an embodiment, more rows or ranks 26; 28; 30 of pillars are provided in the band, and said more ranks are mutually concentrically arranged. Advantageously, the rank 26 arranged in the proximity of the outer diameter D2, far from said disc rotation axis X-X, has at least some of the pillars having a substantially triangular transversal section with the base 32 facing towards the outer part of the disc, and sides 34 within the ventilation duct having a concave profile.

In accordance with an embodiment, said triangular sections extend the sides 34 thereof by overlapping in the direction (distance indicated with the reference O) radial to the adjacent row or rank. Advantageously, the sides radially overlap by 10%-30% the pillars of the adjacent rank, preferably overlap by 20%.

In accordance with an embodiment, in said triangular sections, said sides 34 comprise at least one length consisting in an arc of circumference.

In accordance with an embodiment, the pillars 20 of the braking band are grouped in at least three ranks comprising at least one outer rank 26, defined by pillars having a triangular section with a base 32 facing towards the outer part of the disc, and sides within the ventilation duct having a concave profile, an intermediate rank 30 with pillars having a star-shaped section, and an inner rank 28 near to the disc axis X-X, the pillars of said inner rank 28 having a section which is substantially rhomboidal in a plane parallel to the air flow along the ventilation ducts.

According to a possible further embodiment, the pillars 20 are grouped in three concentric ranks comprising an outer rank 26, arranged in the proximity of the braking band 14 outer diameter D2, an inner rank 28, near to the disc axis X-X, and an intermediate rank 30 between inner rank and outer rank.

Figure 1A:
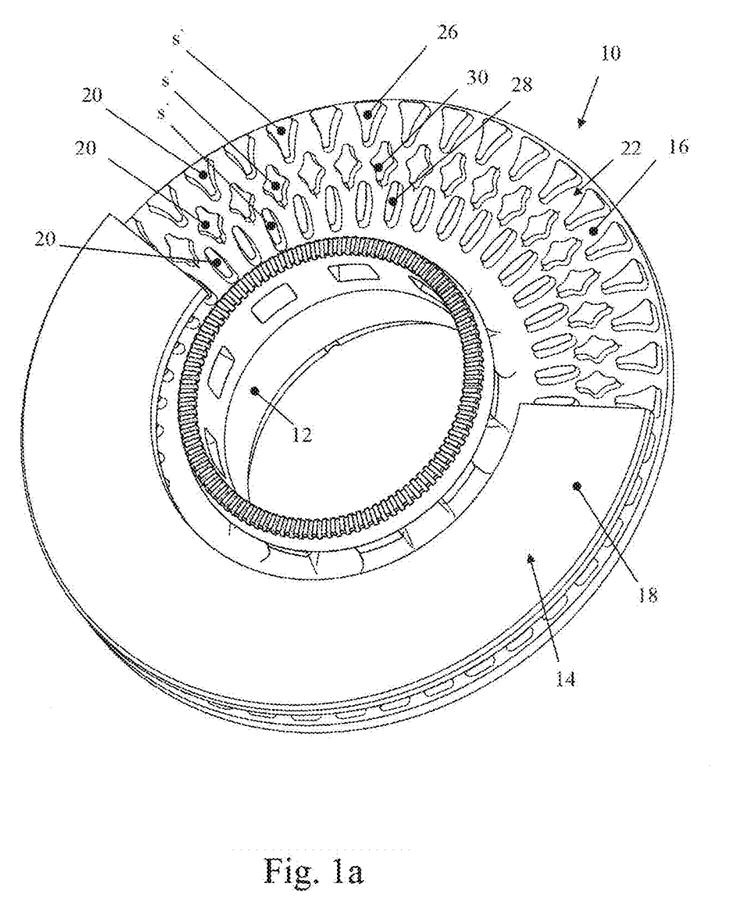
FIGS. 1a and 1b illustrate two partially sectional perspective views of a disc for disc brake.
Figure 1B:
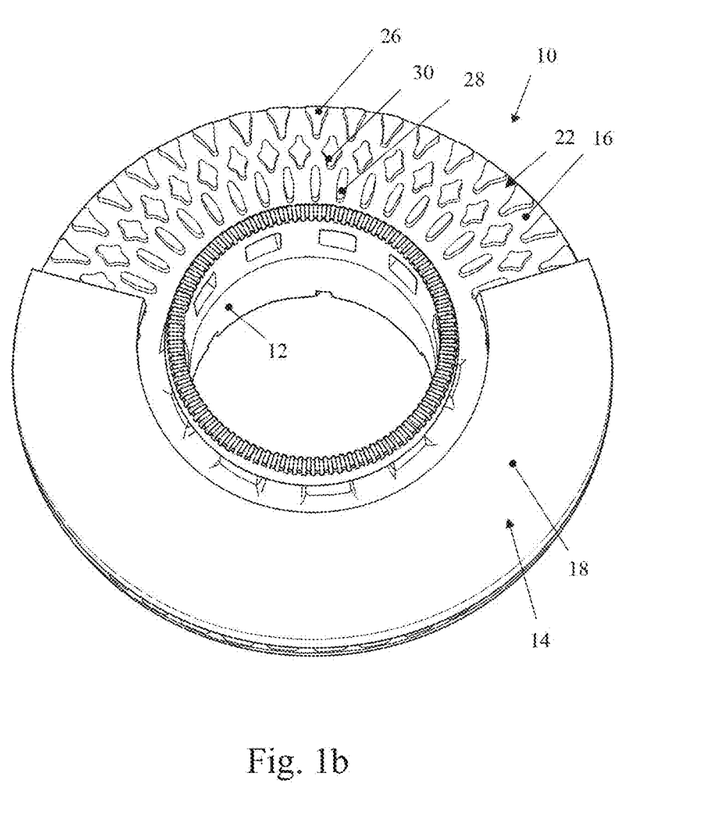
Figure 2:
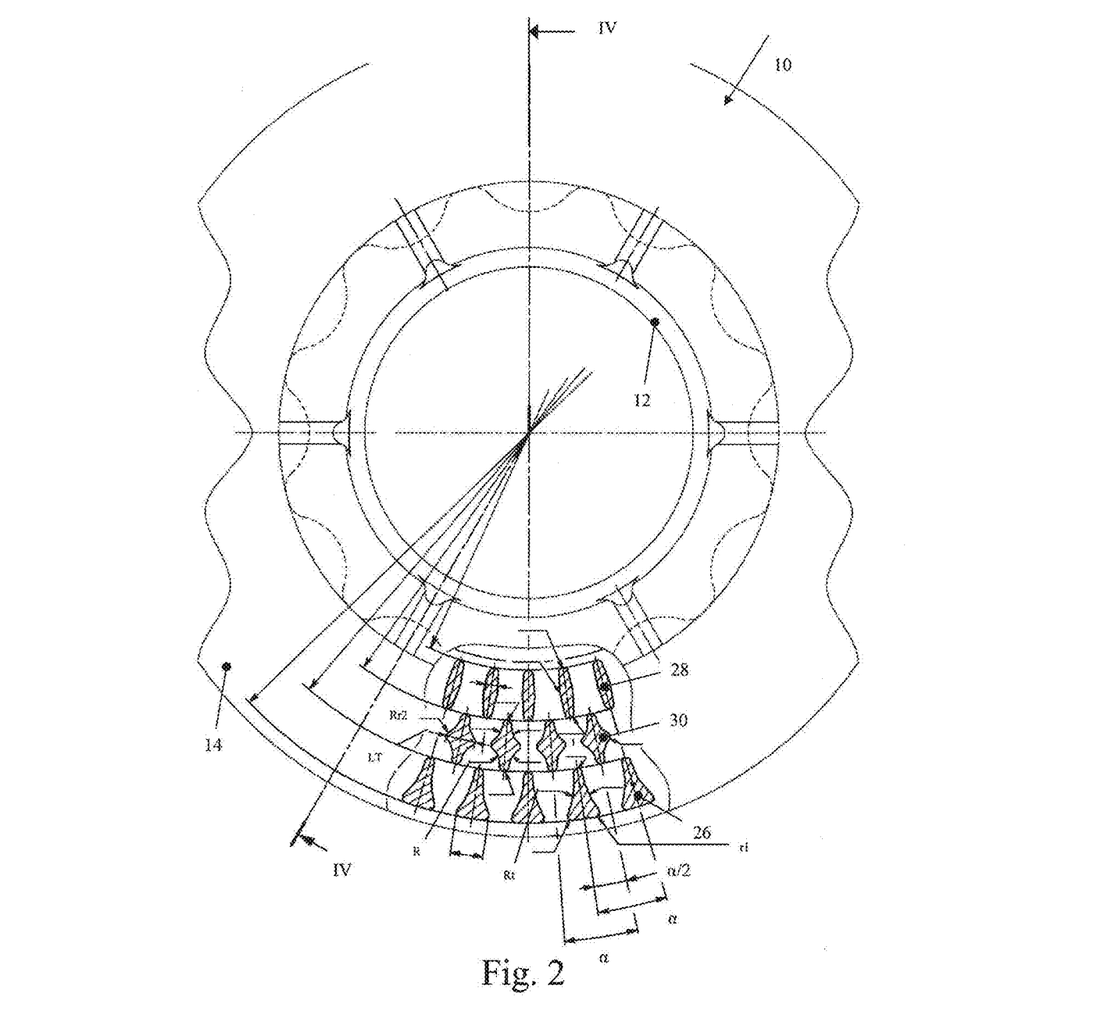
FIG. 2 illustrates a partially sectional partial plan view of the disc for disc brake of FIG. 1.

According to a possible embodiment, the inner rank 28 pillars and the intermediate rank 30 pillars have, in a plane substantially parallel to the air flow along the ventilation ducts, a substantially rhomboidal section (FIGS. 2 and 3) in which the rhombus vertexes are rounded.

Advantageously, the intermediate rank 30 has pillars with a star-shaped section. In other words, while keeping the position of the substantially rhomboidal section vertexes constant, the overall dimensions of the pillars according to the present invention are lower than the overall dimensions of pillars having a rhomboidal section with sides within the ventilation duct which are rectilinear.

Advantageously, the outer rank 26 pillars have, in a plane substantially parallel to the air flow along the ventilation ducts, a substantially triangular section with an enlarged base 32 facing towards the disc outer part, and sides 34 within the ventilation duct having a concave profile. In other words, while keeping the position of the substantially triangular section vertexes constant, the overall dimensions of the pillars according to the present invention are lower than the overall dimensions of pillars having a triangular section with sides within the ventilation duct which are rectilinear.

According to a possible embodiment, for example, in the case of discs having an outer diameter ranging between 350 and 440 mm, the base 32 has a length S ranging between 14 and 22 mm, preferably 18 mm. According to a further embodiment, for example, in the case of discs having an outer diameter ranging between 280 and 350 mm, the base 32 has a length S ranging between 10 and 16 mm, preferably 14 mm.

According to a possible embodiment, the sides 34 comprise at least one length consisting in an arc of circumference having a radius Rt. According to a possible embodiment, for example, in the case of discs having an outer diameter ranging between 280 and 440 mm, the sides 34 comprise at least one length consisting in an arc of circumference having a radius Rt ranging between 36 and 44 mm, preferably 40 mm.

According to a possible embodiment, sides 34 and enlarged base 32 are mutually joined by arched lengths. According to a possible embodiment, for example, in the case of discs having an outer diameter ranging between 350 and 440 mm, sides 34 and base 32 are joined by an arc of circumference having a radius r1 ranging between 2 and 4 mm, preferably 2.5 mm. According to a possible embodiment, for example, in the case of discs having an outer diameter ranging between 280 and 350 mm, sides 34 and base 32 are joined by an arc of circumference having a radius r1 ranging between 1.5 and 4 mm, preferably 2 mm.

According to a possible embodiment, the sides 34 are mutually joined at the vertex within the ventilation ducts by an arched length. According to a possible embodiment, for example, in the case of discs having an outer diameter ranging between 350 and 440 mm, the sides 34 are mutually joined by an arc of circumference having a radius r2 ranging between 2 and 4 mm, preferably 2.5 mm. According to a possible embodiment, for example, in the case of discs having an outer diameter ranging between 280 and 350 mm, the sides 34 are mutually joined by an arc of circumference having a radius r2 ranging between 1.5 and 4 mm, preferably 2 mm.

According to a possible embodiment, for example, in the case of a disc having an outer diameter ranging between 350 and 440 mm, the inner rank 28 pillars 20, if present, have a maximum thickness in the direction tangential to the disc ranging between 6 and 8 mm, preferably 7 mm. According to a possible embodiment, for example, in the case of a disc having an outer diameter ranging between 280 and 350 mm, the inner rank 28 pillars 20, if present, have a maximum thickness in the direction tangential to the disc ranging between 4 and 6 mm, preferably 5 mm.

According to a possible embodiment, for example, in the case of a disc having an outer diameter ranging between 350 and 440 mm, the intermediate rank 30 pillars 20, if present, have a maximum thickness in the direction tangential to the disc ranging between and 20 mm, preferably 16 mm. According to a possible embodiment, for example, in the case of a disc having an outer diameter ranging between 280 and 350 mm, the intermediate rank 30 pillars, 20 if present, have a maximum thickness in the direction tangential to the disc ranging between 8 and 18 mm, preferably 14 mm.

According to a possible embodiment in which at least two ranks are provided, the ranks have a same height LR, i.e. the same dimension in the direction radial to the disc.

According to a further embodiment in which at least two ranks are provided, the ranks do not mutually overlap in the direction radial to the disc. More particularly, each of the ranks extends between two circumferences concentric to the disc in which the circumferences defining adjacent ranks coincide. In other words, with reference to an example in which three ranks of pillars are provided, the circumferences defining the inner rank 28 are respectively indicated with C1 and C2, the circumferences defining the intermediate rank 30 are respectively indicated with C2 and C3, and the circumferences defining the outer rank 26 are respectively indicated with C3 and C4. Advantageously, circumference C2 defines both the inner and intermediate ranks, while circumference C3 defines both the intermediate and outer ranks.

According to a possible embodiment, taking into consideration a band annular portion by sectioning the same band between the two plates at the median plane 24, while keeping the percent ratio between plate surface and the sum of the surfaces s' of the pillars sections (generally, the surface taken by the pillars is substantially equal to 20-25% of the band one) constant, the braking band according to the present invention has a higher number of pillars, therefore a higher total surface of the pillars in the direction transversal to the air flow. Advantageously, the number of pillars for a braking band rank ranges between 35 and 50, even more preferably between 37 and 48.

According to a possible embodiment, in a disc having an outer diameter ranging between 350 and 440 mm, a rank comprises 40 to 47 pillars, preferably 43 pillars. According to a possible embodiment, in a disc having an outer diameter ranging between 280 and 350 mm, a rank comprises 34 to 41 pillars, preferably 37 pillars.

In the case of more ranks, it is advantageous that each rank substantially comprises the same number of pillars.

According to a possible embodiment comprising at least two ranks, the angular distance α between two adjacent pillars of a same rank is equal in each rank. In the case where three ranks are provided, preferably the outer rank pillars are aligned radially to the inner rank ones, while the intermediate rank pillars are offset arranged relative to the ones of the inner and outer ranks, about halfway the angular distance a between two adjacent pillars of the outer or inner ranks.

According to a possible embodiment, the ratio between outer braking band diameter D2, therefore the disc diameter, and the maximum thickness of the interspace between the two plates measured in the direction parallel to the X-X axis, advantageously ranges between 15 and 32, preferably between 21 and 25, even more preferably, it is about 23.

With reference herein below to a disc having an outer diameter ranging between 350 and 440 mm, according to a possible embodiment, the plate 16 arranged at the cap side relative to the median plane 24 of the interspace 22 between the two plates has a thickness in the direction axial to the disc ranging between 10 and 16 mm. According to a possible embodiment, the plate 18 arranged at the cap opposite side relative to the median plane 24 has a thickness in the direction axial to the disc ranging between 10 and 15 mm. According to a further embodiment, the interspace 22 between the two plates has a maximum dimension in the direction axial to the disc ranging between 14 and 20 mm, preferably 16 mm. The two plates can have the same or different thicknesses.

With reference herein below to a disc having an outer diameter ranging between 280 and 350 mm, according to a possible embodiment, the plates 16, 18 have a thickness in the direction axial to the disc ranging between 7 and 10 mm, preferably 8 mm. According to a possible further embodiment, the interspace 22 between the two plates has a maximum dimension in the direction axial to the disc ranging between 10 and 15 mm, preferably 14 mm. The two plates can have the same or different thicknesses.

In accordance with an embodiment, a disc for a ventilated-type disc brake 10 comprises a cap 12 and a braking band 14 as defined above.

From what has been set forth above, it can be appreciated how the provision of a braking band and a disc for disc brake in accordance with the present invention allows unusually improving the thermal exchange efficiency by limiting the maximum temperatures in the case of equal thermal stresses, or allowing undergoing higher thermal stresses while keeping the maximum temperatures which are reached constant, while improving the structural resistance of the braking band central portion, or it allows higher stresses during the braking actions.

As it shall be appreciated from what described above, the shape of the intermediate rank pillars and, optionally, of the rank near to the outer diameter D2, improves the thermal exchange efficiency. Furthermore, both the configuration and the arrangement and distribution of the pillars of the inner and intermediate ranks seem to be particularly advantageous.

Furthermore, the provision of a disc which at the same time has a closer arrangement of the pillars, particularly, arranged in three ranks, and having sections in a plane parallel to the air flow according to what has been described above turns out to be particularly advantageous and synergic.

The advantageous effects of the present solution, in which the outer rank 26 radially overlaps the intermediate rank, have been shown in some tests carried out in a virtual test stand, which results are illustrated in the Figures. In such tests an air flow is simulated which has a constant speed at a preset distance from the disc. Both air movement, and heat generated during the braking are simulated. The results are particularly useful in order both to foresee the disc behaviour at a real test stand, and to compare discs having different configurations.

Figure 9A:
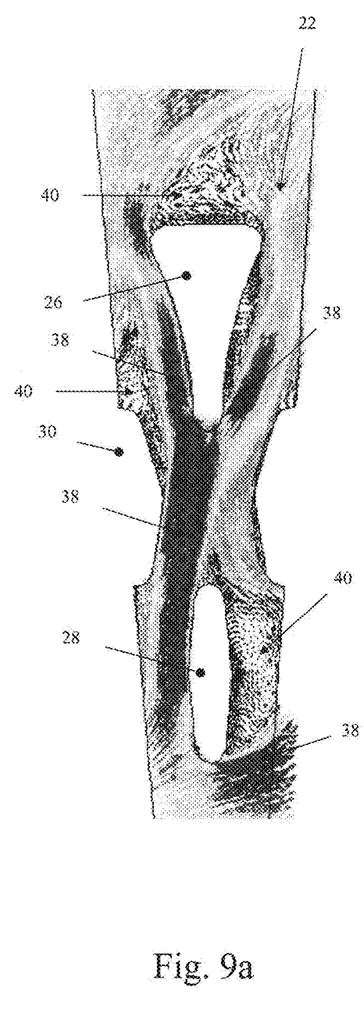
FIGS. 9a and 9b illustrate the theoretical results for the air speed distribution inside the ventilation ducts in a disc for disc brake according to FIG. 6a (field of motion) compared to the state of the art.
Figure 9B:
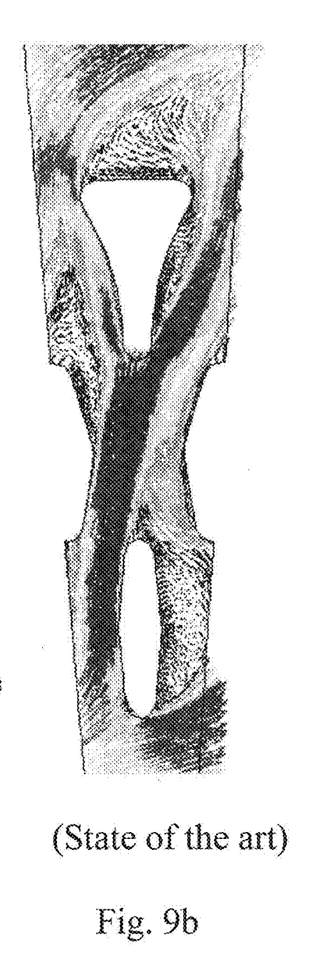

FIG. 9a illustrates, compared to the state of the art solutions of FIG. 9b, the field of motion of the air inside the ventilation ducts, i.e. the air speed distribution inside the ventilation ducts. The areas indicated with 38 correspond to the air preferred ducts, i.e. the ones in which the air flow has a maximum speed, while the areas indicated with 40 indicate the air flow areas which least efficiently subtract heat, i.e. the areas in which the air flow has the lowest speed. The latter areas 40 are also called "wakes".

Figures 8A, 8B:
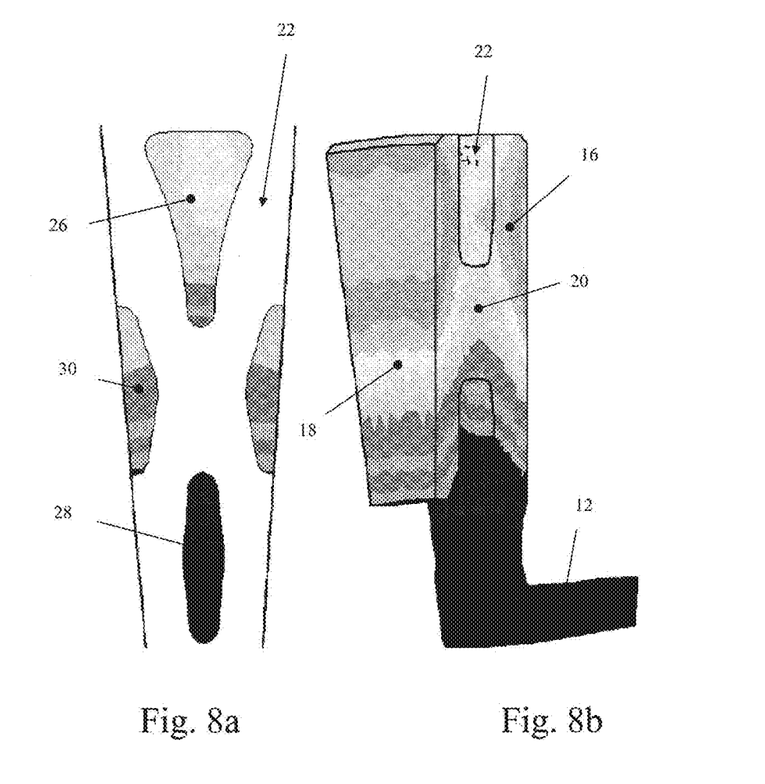
FIGS. 8a, 8b and 8c, 8d illustrate the theoretical results for the temperature distribution in a disc for disc brake according to FIG. 6a (8a, 8b) compared to the state of the art (8c, 8d)
Figure 8C:
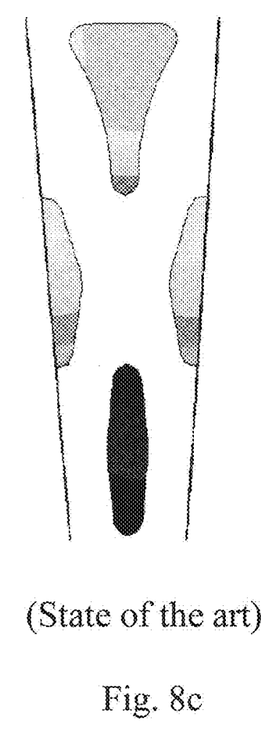
Figure 8D:
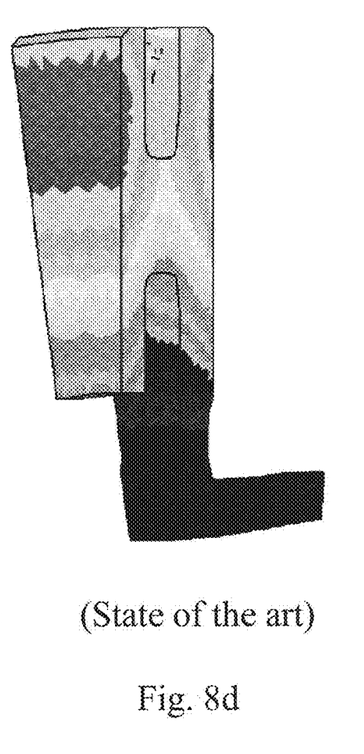

FIGS. 8a, 8b illustrate, compared to the state of the art solution of FIGS. 8c and 8d, the distribution of the temperatures reached by the disc during the simulated braking. The areas are marked by tones of grey turning to black.

The advantageous shape of the outer rank pillars allows obtaining what follows. The indicated effects are further strengthened by the interspace advantageous dimensions, and by the shape and number of the pillars of the inner rank and intermediate rank, if present.

It shall be appreciated that the air flow is directed to the direction radial to the disc and is considerably accelerated, also achieving a more even distribution of the flow. In fact, the areas 38 in the prior art turn out to be very slopped relative to a disc radius, while they are substantially radial in the present invention. Particularly, the shape of the outer pillars does not hinder the air outflow; on the contrary, it canalizes and accelerates the flow thereof. The areas 40 or wakes, i.e. the areas which do not efficiently subtract heat, turn out to be much more reduced compared to the prior art.

Advantageously, the present invention allows achieving a number of triggers of vortexes widely spread on the whole surface of the pillars, moreover on the outer ones. The enlargement of the vertex of the outer pillars towards the inner part of the interspace, thanks to the concave shape of the respective sides, enlarges the surface transversally opposing the air flow, thus allowing a formation of vortexes moreover at the pillar vertex and in the whole surrounding area.

It has been further found that the vortexes which are created have a high energy, moreover at the outer pillars, concurring in the creation of turbulent conditions, which are particularly efficient from the point of view of the heat removal.

Therefore, the present invention allows obtaining more triggers of turbulences and a higher mixing of the air flow, concurring to increase the efficiency in the removal of heat which is generated during the braking action.

Such advantageous aspects are further highlighted in that the temperature, particularly the maximum temperature of the central outer portion of the plates, is considerably lower, while keeping the thermal stress to which the disc is subjected relative to the known discs constant. It has been further found that the maximum absolute temperature reached by the braking band in accordance with the present invention is considerably below 850° K on the plate outer portion which is arranged at the cap side relative to a median plane 24. Under the same conditions, the known braking bands reached 868° K, respectively.

It has been further found that the maximum temperature of a braking band according to the present invention is about 500° C. for a heat flow of 0.370 W/mm², while the known braking bands reached 604° C. in the same position. As a further confirmation, while keeping the maximum temperature constant, the braking bands according to the present invention undergo heat flows (about 0.45 W/mm²) which are higher than the one of the prior art (0.36 W/mm²)

First, the braking band according to the present invention allows obtaining the reduction of the maximum temperature reached just at the point where cracks in the braking surface occurs, while increasing the structural strength. This allows eliminating the formation of cracks on the braking surface upon time. Second, the temperature decrease both of duct and cap concurs to keep the cap thermal deformation reduced, particularly when considering a direction parallel to the disc axis X-X.

Beside what has been indicated above, the advantageous shape of the pillars of the intermediate rank and, advantageously, the outer rank, allows an enlargement of the base of the same, while keeping the outer disc diameter and the pillar overall dimensions constant, avoiding the inlet of stones or debris which occlude the air passage. In fact, they are discs which are intended to be particularly mounted on transport means such as trucks or the like, moreover intended for use in poorly practicable areas such as, for example, working sites.

Distribution, number and shape of the pillars, in combination with the reduction of the plate thickness concurs reducing the disc weigh of about 10%-15% relative to the known discs.

The closer arrangement of the pillars which is implemented turns out to be optimal in the attempt to conciliate the conflicting needs to increase the disc thermal efficiency, to increase the resistance to cracks, and to avoid complications in the manufacturing of the disc or braking band melting core.

The interspace maximum thickness is increased relative to the known discs, turning out to be particularly advantageous to increase the ventilation ducts section.

It shall be apparent that variations and/or additions to what has been described and illustrated above can be provided.

The connecting means between the two plates can be composed only of the intermediate rank, or also only of the outer rank of pillars, or providing other embodiments substituting for the inner rank. Particularly, other pillar shapes, or other connecting mean shapes can be provided.

The braking band can be a single piece with the cap, or it can be manufactured independently, and subsequently connected thereto.

To the preferred solution of implementation of the disc described above, those skilled in the art, to the aim of meeting contingent, specific needs, will be able to make a number of modifications, adaptations, and replacements of elements with other functionally equivalent ones, however without departing from the scope of the following claims.

The invention claimed is:

1. Braking band of a disc for a ventilated disc brake, said braking band extending between an inner diameter, near to a disc rotation axis, and an outer diameter, far from said disc rotation axis,
   said braking band comprising two plates mutually facing and defining an interspace,
   said plates being mutually linked by heat dissipation and connecting means,
   at least some of said heat dissipation and connecting means being shaped as columns projecting from a plate towards the opposite plate in the form of pillars,
   said pillars being grouped in at least one circumferentially arranged rank,
   at least some of said pillars of said at least one rank having, in a plane substantially parallel to an air flow along ventilation ducts, a substantially rhombus shaped section with four convex vertexes joined by four concave sides to form a star shape, wherein the four concave sides and four vertexes are mutually joined and entirely formed by curved lines in an arc shape such that at least one of the vertexes is disposed between two of the concave sides and includes a first radius between 1 mm and 4 mm, and each of the concave sides includes at least one portion in the form of an arc of a circle, having a second radius between 5 mm and 20 mm,
   wherein said pillars are grouped in at least three ranks comprising at least one outer rank, an inner rank near the disc axis, and an intermediate rank with pillars having the star-shaped section configured to improve a thermal exchange efficiency and to avoid the inlet of stones or debris in the air flow, wherein the star-shaped section is further configured to induce turbulent conditions.

2. The braking band according to claim 1, wherein all the said pillars of said at least one rank have said substantially rhombus shaped section with concave sides.

3. The braking band according to claim 1, a first plurality of ranks includes the at least three ranks, and a second plurality of ranks of pillars are provided, said second plurality of ranks being arranged mutually concentrically, wherein each pillar is offset relative to the nearest pillars of the adjacent ranks in a quincunx arrangement.

4. The braking band according to claim 1, wherein the first radius is 2.5 mm.

5. The braking band according to claim 1, wherein the second radius is 12 mm.

6. The braking band according to claim 1, wherein said substantially rhombus shaped section is symmetrical relative to a radial axis transversal to the disc rotation axis and symmetrical relative to a tangential axis arranged orthogonally to said radial axis and also to the rotation axis.

7. The braking band according to claim 1, wherein said substantially rhombus shaped section extends in the radial direction by a preset height and in the tangential direction by a preset width, and wherein said height is between 1.5 and 2 times the width.

8. The braking band according to claim 1, wherein a first plurality of ranks includes the at least three ranks, and a second plurality of ranks of pillars are provided, said second plurality of ranks being arranged mutually concentrically, and wherein the rank arranged in the proximity of the outer diameter, far from said disc rotation axis has at least some of the pillars having a substantially triangular transversal section with a base facing towards a disc outer part, and sides within the respective ventilation ducts having a concave profile.

9. The braking band according to claim 8, wherein said triangular sections extend the sides thereof by overlapping the adjacent rank in the radial direction by 10%-30%.

10. The braking band according to claim 8, wherein, in said triangular sections, said sides comprise at least one length having an arc shape.

11. The braking band according to claim 8, wherein said triangular sections extend the sides thereof by overlapping the adjacent rank in the radial direction by 20%.

12. The braking band of a disc for a ventilated disc brake according to claim 1, wherein the at least one outer rank is defined by pillars having a triangular section and and the pillars of said inner rank have a substantially rhomboidal section in a plane parallel to the air flow along the ventilation ducts.

13. The braking band of a disc for a ventilated disc brake according to claim 1, wherein the sections of the pillars of at least two ranks in the same plane parallel to the air flow have the same radial extension.

14. The braking band of a disc for a ventilated disc brake according to claim 1, wherein each of said ranks is circumferentially arranged and does not mutually overlap in the radial direction.

15. The braking band of a disc for a ventilated disc brake according to claim 14, wherein the number of pillars is the same in all the ranks.

16. The braking band of a disc for a ventilated disc brake according to claim 1, wherein the ratio between the outer diameter and the maximum thickness of the interspace between the two plates measured in the direction parallel to the disc axis ranges between 15 and 32.

17. Disc for a ventilated disc brake, comprising a hub and a braking band, said braking band extending between an inner diameter, near to a disc rotation axis, and an outer diameter, far from said disc rotation axis, said braking band comprising two plates mutually facing and defining an interspace, said plates being mutually linked by heat dissipation and connecting means, at least some of said heat dissipation and connecting means being shaped as columns projecting from a plate towards the opposite plate in the form of pillars, said pillars being grouped in at least three circumferentially arranged ranks comprising at least one outer rank, an inner rank near the disc axis, and an intermediate rank, at least some of said pillars of said intermediate rank having, in a plane substantially parallel to an air flow along ventilation ducts, a substantially rhombus shaped section with four convex vertexes joined by four concave sides to form a star shape, wherein the four concave sides and four vertexes are mutually joined and entirely formed by curved lines in an arc shape such that at least one of the vertexes is disposed between two of the concave sides and includes a first radius between 1 mm and 4 mm, and each of the concave sides includes at least one portion in the form of an arc of a circle, having a second radius between 5 mm and 20 mm, the star shape being configured to improve a thermal exchange efficiency and to avoid the inlet of stones or debris in the air flow, the pillars having the star-shape being further configured to induce turbulent conditions.

18. Pillar for a connection between two plates of a braking band of a disc for a ventilated disc brake, said braking band extending between an inner diameter, near to a disc rotation axis, and an outer diameter, far from said disc rotation axis, said plates being mutually facing and defining an interspace, said plates being mutually linked by at least said pillar, said pillar having, in a plane substantially parallel to an air flow along a ventilation duct, a substantially rhombus shaped section with four convex vertexes joined by four concave sides to form a star shape, wherein said four concave sides and four vertexes are mutually joined and entirely formed by curved lines in an arc shape such that at least one of the vertexes is disposed between two of the concave sides and includes a first radius between 1 mm and 4 mm, and each of the concave sides includes at least one portion in the form of an arc of a circle, having a second radius between 5 mm and 20 mm, wherein the star shape is configured to improve a thermal exchange efficiency, to avoid the inlet of stones or debris in the air flow, and to induce turbulent conditions.

* * * * *